United States Patent Office 3,298,108
Patented Jan. 17, 1967

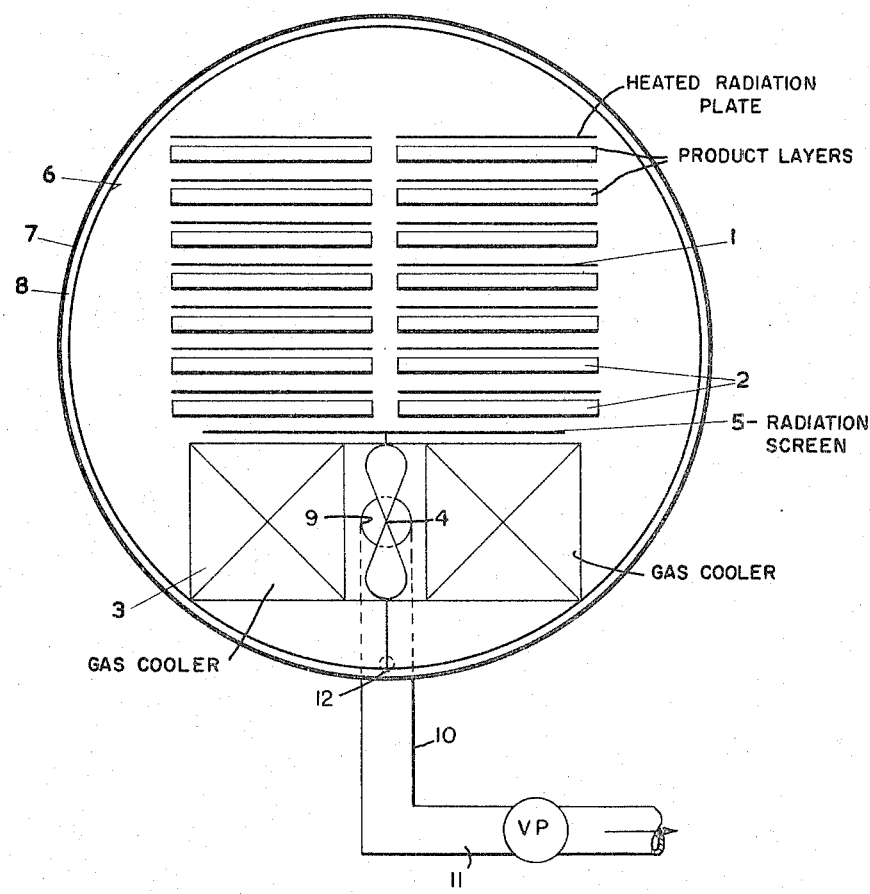

3,298,108
METHOD AND APPARATUS FOR FREEZING AND FREEZE-DRYING
Geert Seffinga, Ede, Netherlands, assignor to SEC N.V., Seffinga Engineering Company, Ede, Netherlands, a Dutch corporation
Filed July 29, 1964, Ser. No. 385,915
Claims priority, application Netherlands, Aug. 2, 1963, 296,143
10 Claims. (Cl. 34—5)

The invention relates to a method and an apparatus for freezing and freeze-drying, in which the supply of the sublimation heat is not effected by contact between the product and a heating plate, but by radiation or dielectric heating, for instance.

When such a freeze-drying apparatus was used, the freezing process hitherto took place in a separate freezing apparatus. The frozen product thus had to be conveyed from the freezing apparatus to the drier. Since the ambient temperature and the temperature of the air in the drier are higher than the temperature of the frozen product, heat will flow to the product as it is transferred to the drier and during the evacuation of the drier. When a sufficiently high vacuum has been attained, this convective heat supply stops. This supply of heat to the product will in general involve freezing of water vapour thereon.

From the above it follows that the time available for charging and evacuation is very limited, since otherwise the product will thaw and foam during evacuation before the freeze-drying process has started.

In order to avoid the risk of thawing during charging and evacuation as much as possible, the driers were hihterto constructed as small units with relatively large vacuum pumps.

Futhermore the known process has the disadvantage that, dependent on the circumstances, risk of infection during transfer is present.

It is the object of the invention to obviate the said drawbacks, to which end the drier is so constructed that it serves also as the freezing aparatus, while the heat of solidification is removed by a circulating gas.

Thus it is possible to construct larger units with less large pumps for evacuation, which considerably reduces the cost of installation with a given capacity.

By reference to the drawing the invention is explained more fully.

The apparatus comprises a number of plates, expanded sheets, or the like, on which the product 2 is placed in layers. If the heat of sublimation is supplied by radiation, a radiation plate 1 is fitted parallel to the layer of product, on either side of it.

The apparatus is further provided with an air cooler-condenser 3, which corresponds to the evaporator of the cooling plant. The air cooler-condenser 3 consists of two parts, between which is arranged a fan 4. Between the system of cooler 3 with fan 4 and the space in which the product 2 is present a radiation screen 5 has been placed.

During the freezing process, which usually takes place at atmospheric pressre, a gas, such as air, is circulated by the fan(s) through the air cooler-condenser 3 and over and in contact with the product 2. In the condenser 3 the gas is cooled; as this gas flows over and in contact with the product 2 heat of solidification is removed from the latter.

After the product 2 has been frozen, the fans 4 are disconnected and the apparatus is evacuated, after which sublimation heat is supplied to the frozen product 2. The water vapour coming from the product 2 condenses on the air cooler-condenser 3, which is cooled by the cooling plant also during the drying process.

The arrangement of the fan 4 between the two parts of the air cooler-condenser 3 involves the advantage that the fan 4 does not form a resistance to the water vapour flowing to the condenser 3.

In consequence of the arrangement of the air cooler-condenser 3 with the radiation screen 5, as described, heat losses from the space in which the product 2 is present to the condenser 3 are avoided, while this arrangement at the same time reduces the flow resistance during the freezing and drying processes to a minimum.

The body of the container, which may, for instance, have a diameter of 350 cm. and a length of 10 m., has been constructed with double walls, for the following reasons:

During the freezing process the aparatus must be cooled and during the drying process it must be heated. The cooling and the heating capacity respectively required for this must be kept as small as possible. If the body were to consist of a single wall, in view of the reduced pressure prevailing in the container during the freeze-drying process this wall would have to be made of fairly thick sheet steel, e.g. 10 mm. thick. This sheet would then have to be cooled and heated alternately, which requires a large amount of energy. By providing two walls, viz. an inner wall 6 and an outer wall 7, with a space 8 in between, it is possible to set up in the space 8 a pressure which is equal to or lower than the pressure prevailing in the container during the freeze-drying process.

It is true that the outer wall 7 will then be subject to external over-pressure, and will therefore have to be constructed to be thick, but the inner wall 6 will only be exposed to internal over-pressure, in view of which this wall 6 can be made of much thiner sheet steel, e.g. 2 mm. thick. When the space 8 is used at the same time to insulate the container, it is only the thinner inner wall 6 that has to be cooled and heated respectively, not the thicker outer wall 7.

The evacuation for maintaining the vacuum required during the freeze-drying can be effected by suitable means of conventional nature. As illustrated schematically in the drawing, an outlet 9 leading from the space inside the container is connected with a vacuum pipe 10 having an evacuating device VP in part 11 thereof. The vacuum pipe may also communicate, as through a connection 12, with the space 8 between the container walls 6 and 7.

What I claim is:

1. A method of freeze-drying which comprises freezing a freezable substance to be dried by forcibly circulating a cooling gas in contact successively with cooling surfaces and with said substance in a closed container, and after said substance is frozen subliming ice formed in it by heating it indirectly and under vacuum in said container and drawing away and condensing resulting water vapor, said substance being maintained in place in the same container during both the freezing and the sublimation.

2. A method of freeze-drying which comprises freezing a freezable substance to be dried in a closed container by forcibly circulating a cooling gas in contact successively with said substance and with cooling surfaces disposed at a location away from said substance, and after said substance is frozen subliming ice formed in it by heating it under vacuum in the same container and drawing into contact with and condensing on said cooling surfaces water vapor formed by the sublimation.

3. A method of freeze-drying which comprises freezing layers of a freezable substance to be dried by forcibly circulating air in contact successively with said layers in a container and with cooling surfaces disposed at a location away from said layers, after said layers are frozen subliming ice from them by drawing a vacuum in the same container and radiating heat to them from heated radiation surfaces located in said container, and simultaneously drawing into contact with and condensing on said cooling surfaces water vapor formed by the sublimation.

4. Freeze-drying apparatus comprising a closed container, means in said container for supporting therein a freezable substance to be dried, gas cooling means in said container, means for forcibly circulating a gas in said container in contact successively with said cooling means and with said substance to freeze said substance, means in said container for heating said substance after it is frozen, and means for evacuating the space in said container to sublime ice from the heated frozen substance therein and for drawing the resulting water vapor into contact with said gas cooling means for condensation thereon.

5. Apparatus according to claim 4, said cooling means comprising cooling surfaces located in a path of gas flow common to said gas circulating means and said evacuating means.

6. Apparatus according to claim 4, said supporting means comprising at least one tier of vertically spaced shelves for holding layers of said substance and said heating means comprising radiation plates spaced above and between said shelves.

7. Apparatus according to claim 4, said gas circulating means comprising a fan and said cooling means comprising cooling surfaces arranged in the path of gas flow at either side of said fan, said supporting means comprising tiers of vertically spaced shelves for holding layers of said substance and arranged at either side of a plane occupied by said fan, and said heating means comprising a multiplicity of radiation plates respectively spaced above and between said shelves.

8. Apparatus according to claim 4, said supporting means and said heating means being located in an upper space of said container, said cooling means and said gas circulating means being located in a lower space thereof, and there being a radiation screen located between said spaces.

9. Apparatus according to claim 8, said gas circulating means comprising a fan and said cooling means comprising cooling surfaces in the path of the gas flow at either side of said fan.

10. Apparatus according to claim 4, said container being constituted by inner and outer walls defining a heat-insulating space therebetween, there being means for establishing in said heat-insulating space a pressure not exceeding the pressure existing inside said container during the sublimation, said outer wall being relatively thick and said inner wall being relatively thin whereby losses of cooling and heating energy through said container are diminished.

References Cited by the Examiner

UNITED STATES PATENTS

| | | | |
|---|---|---|---|
| 1,215,951 | 2/1917 | Martini | 34—92 |
| 2,132,897 | 10/1938 | Gentele | 34—15 |
| 2,333,850 | 11/1943 | Dunkley | 34—5 |
| 2,480,954 | 9/1949 | Palmer | 34—5 |
| 2,528,476 | 10/1950 | Roos | 34—92 |
| 2,533,125 | 12/1950 | Levinson | 34—5 |
| 2,668,364 | 2/1954 | Cotton | 34—5 |
| 3,001,382 | 9/1961 | Mills | 62—63 |
| 3,024,117 | 3/1962 | Barlow | 34—5 |
| 3,132,930 | 5/1964 | Abbott | 34—5 |
| 3,135,589 | 6/1964 | Stokes | 34—5 |
| 3,169,070 | 2/1965 | Mehrlich | 34—5 |
| 3,178,829 | 4/1965 | Cox | 34—5 |
| 3,192,643 | 7/1965 | Rieutord | 34—54 |

WILLIAM J. WYE, *Primary Examiner.*